July 21, 1942.  D. D. HUYETT  2,290,188
MACHINE FOR FORMING AND APPLYING SHUNTS
Filed July 7, 1939   10 Sheets-Sheet 1
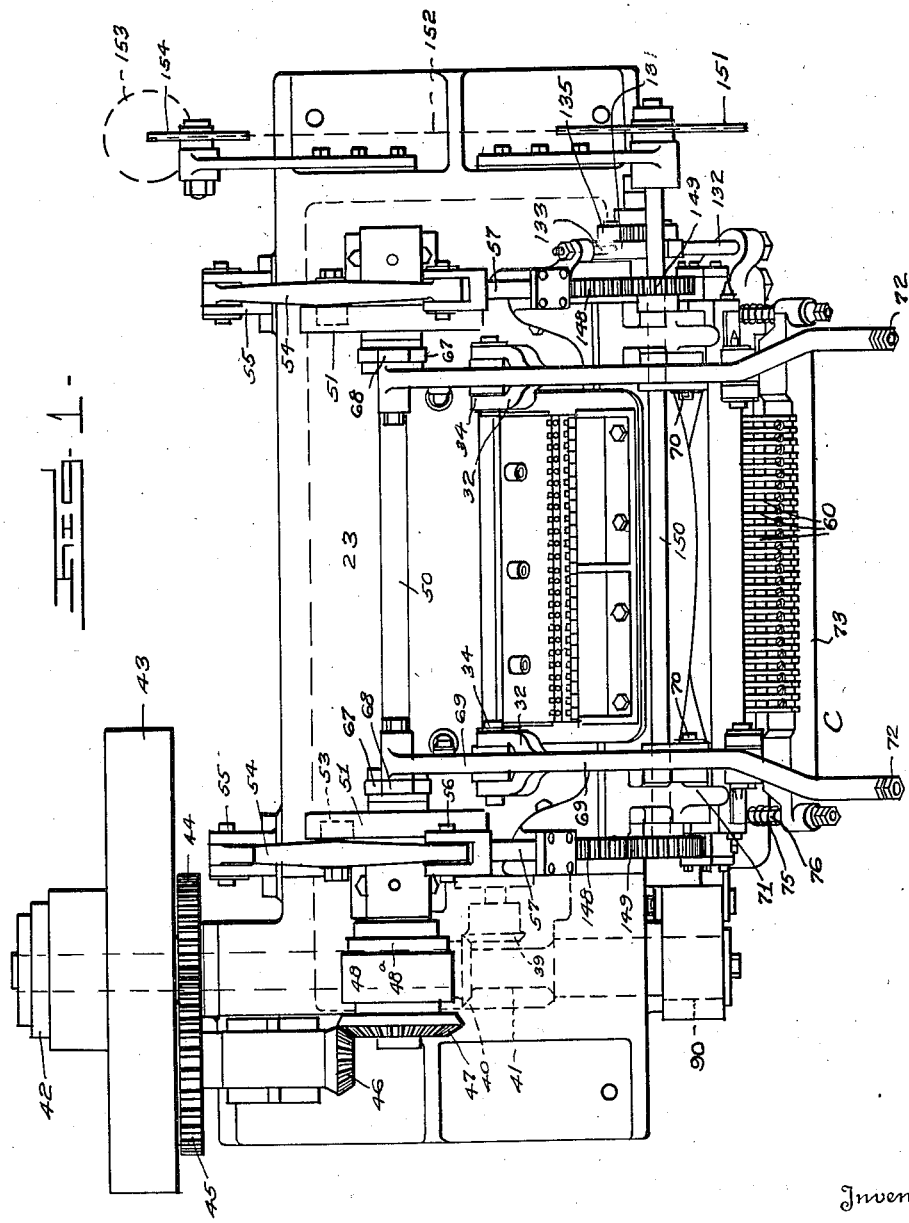
Inventor
DANIEL D. HUYETT,
By Kenneth E. Mulford
Attorney

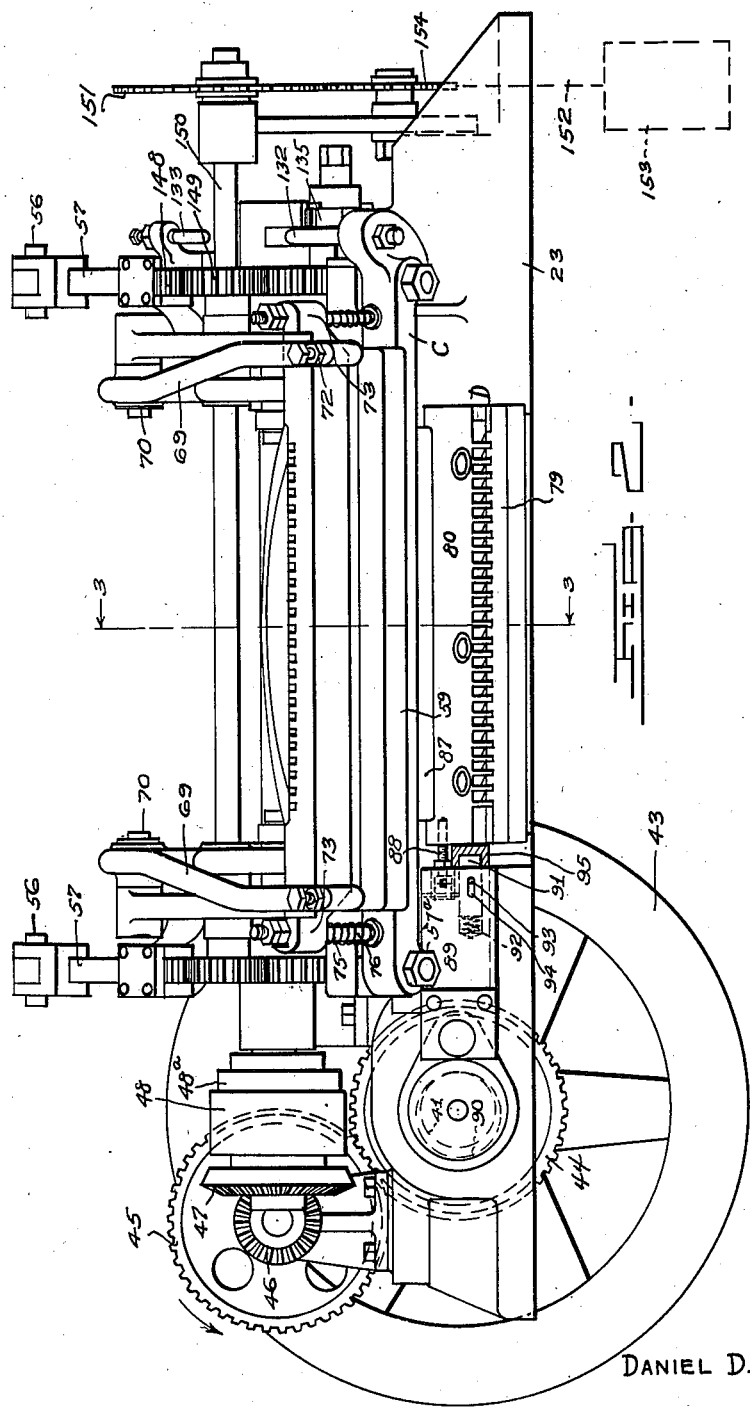

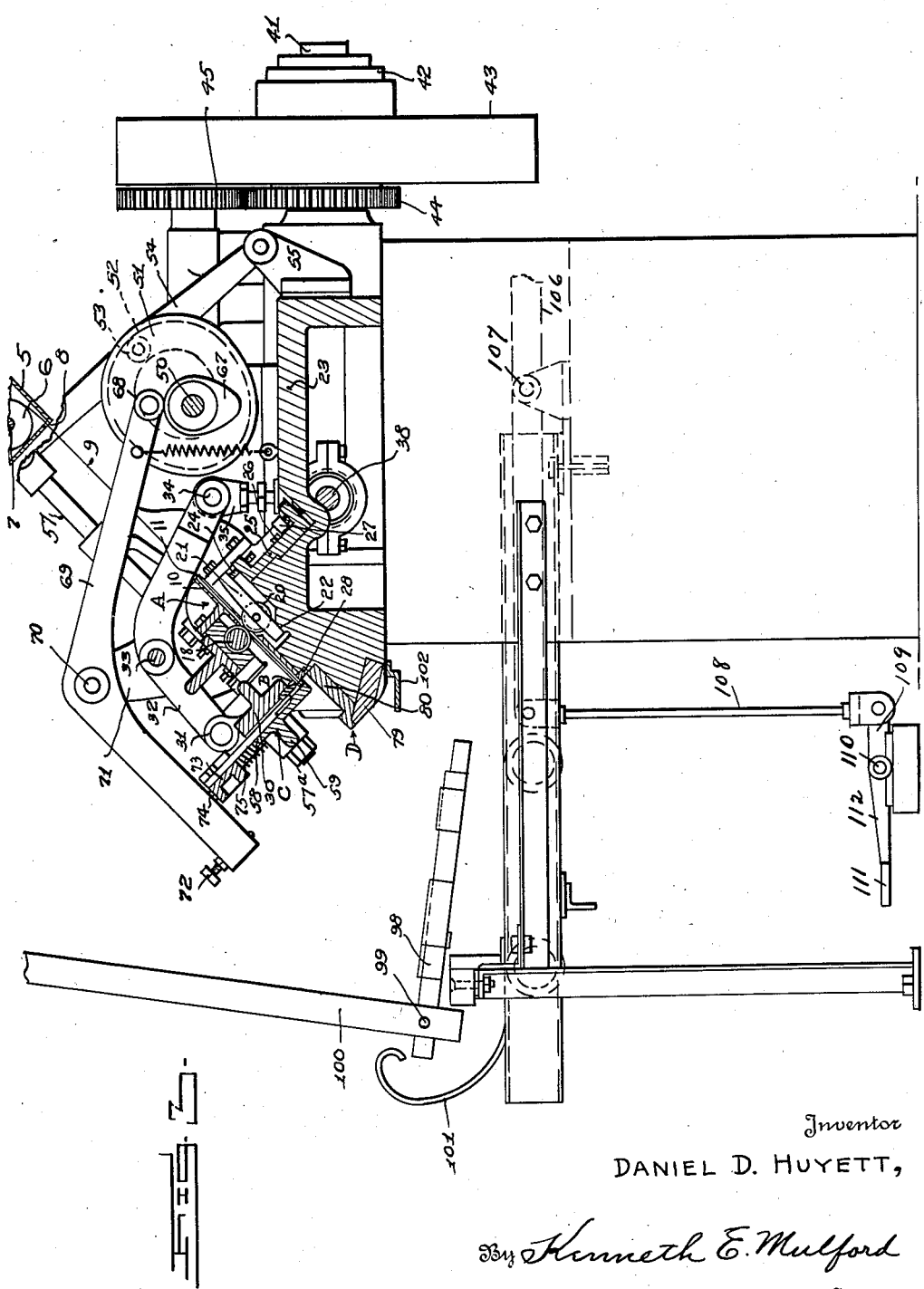

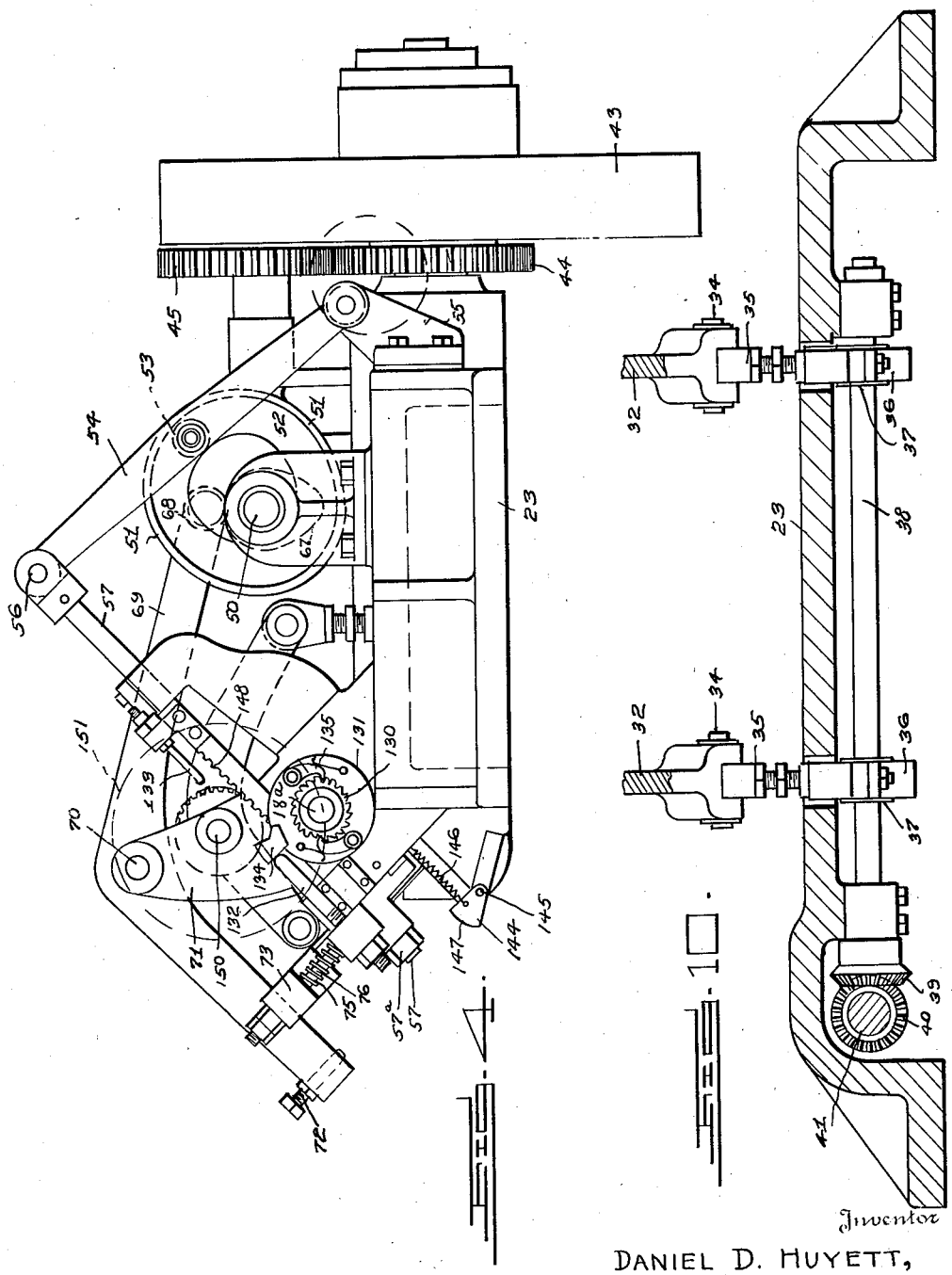

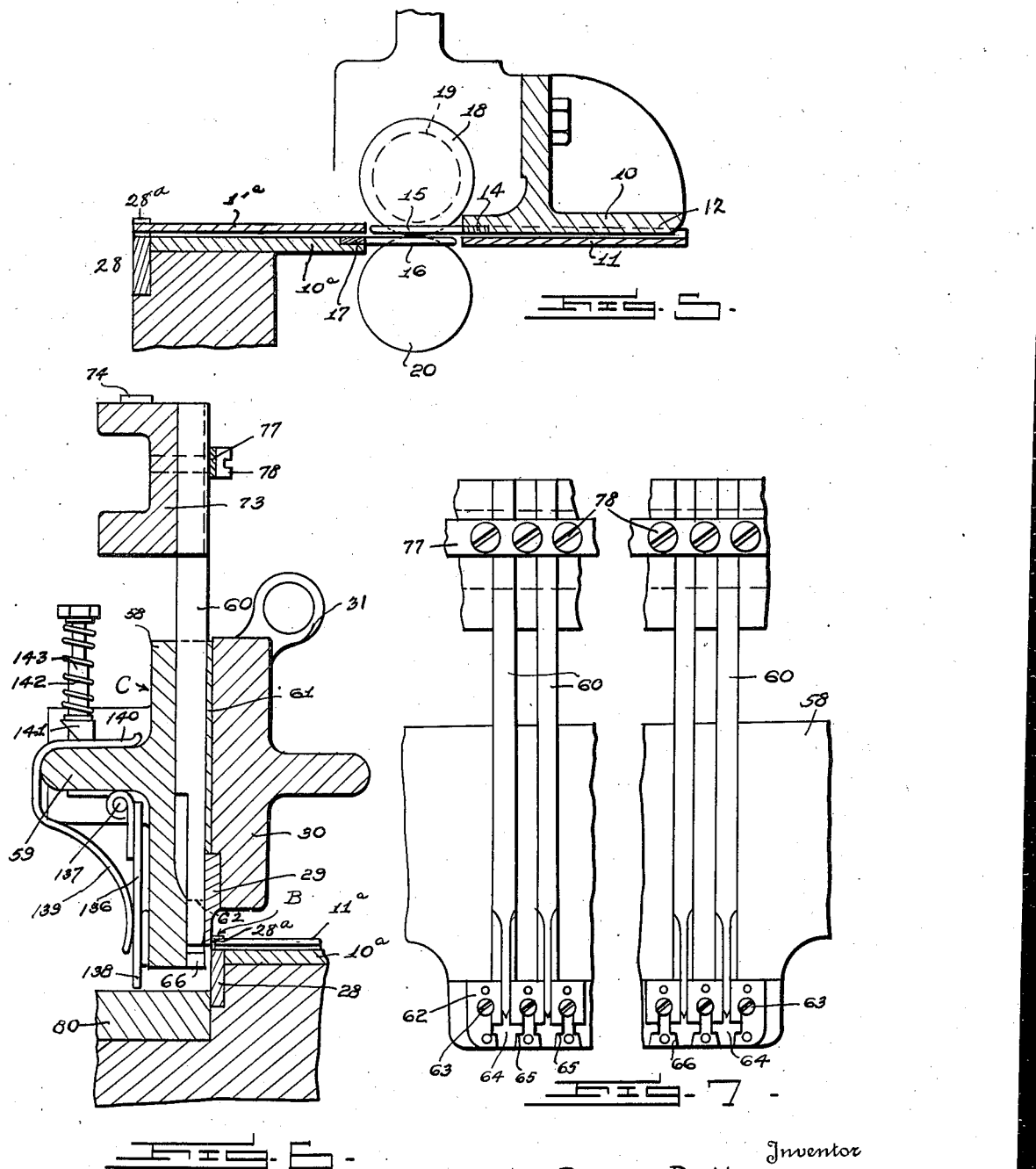

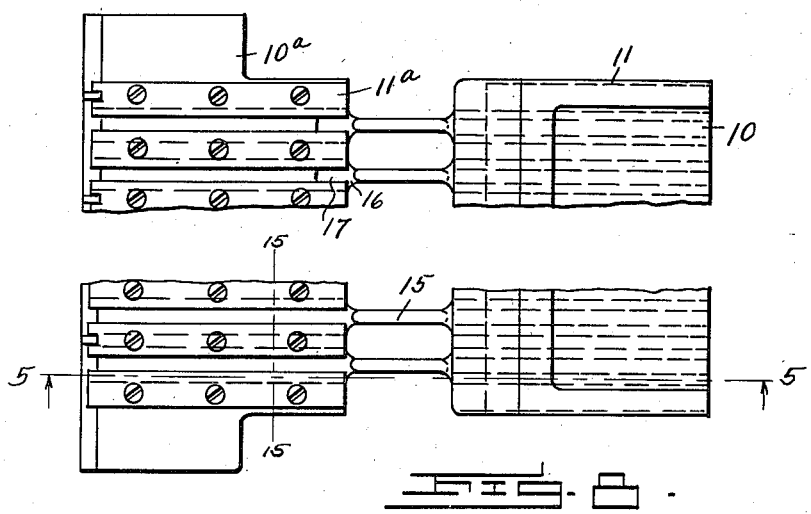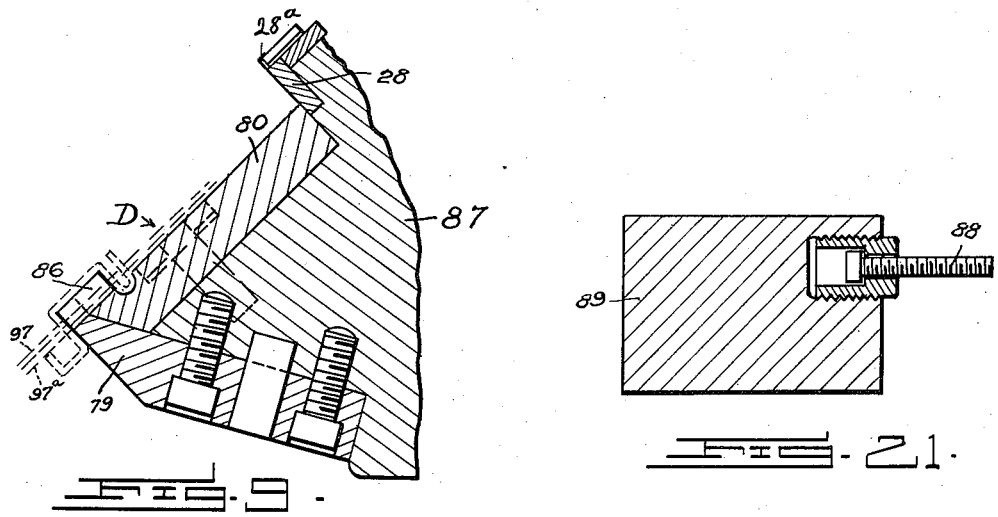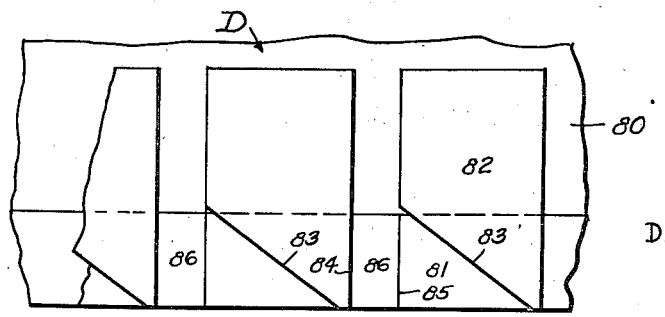

July 21, 1942.　　　D. D. HUYETT　　　2,290,188
MACHINE FOR FORMING AND APPLYING SHUNTS
Filed July 7, 1939　　　10 Sheets-Sheet 7
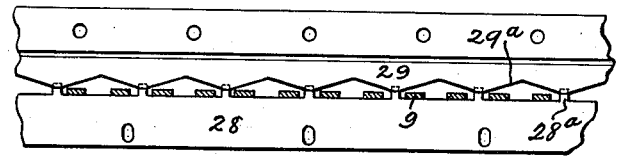
Fig. 12.
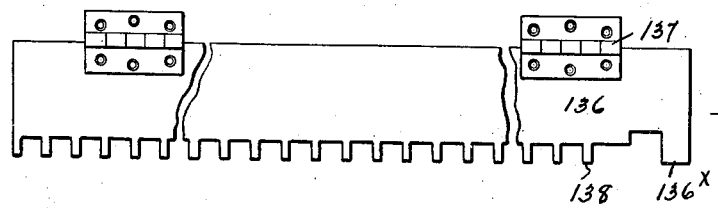
Fig. 13.
Fig. 14.
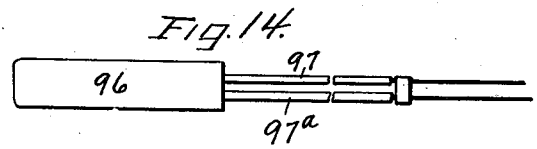
Fig. 15.
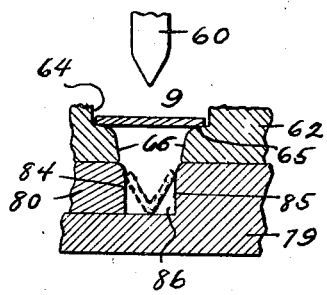
Fig. 16.
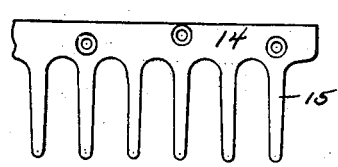
Fig. 17.
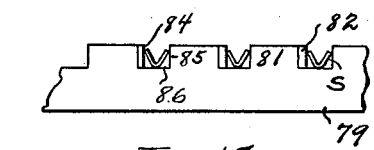
Fig. 18.
Inventor
Daniel D. Huyett
By Kenneth E. Mulford
Attorney July 21, 1942.　　　D. D. HUYETT　　　2,290,188
MACHINE FOR FORMING AND APPLYING SHUNTS
Filed July 7, 1939　　　10 Sheets-Sheet 8
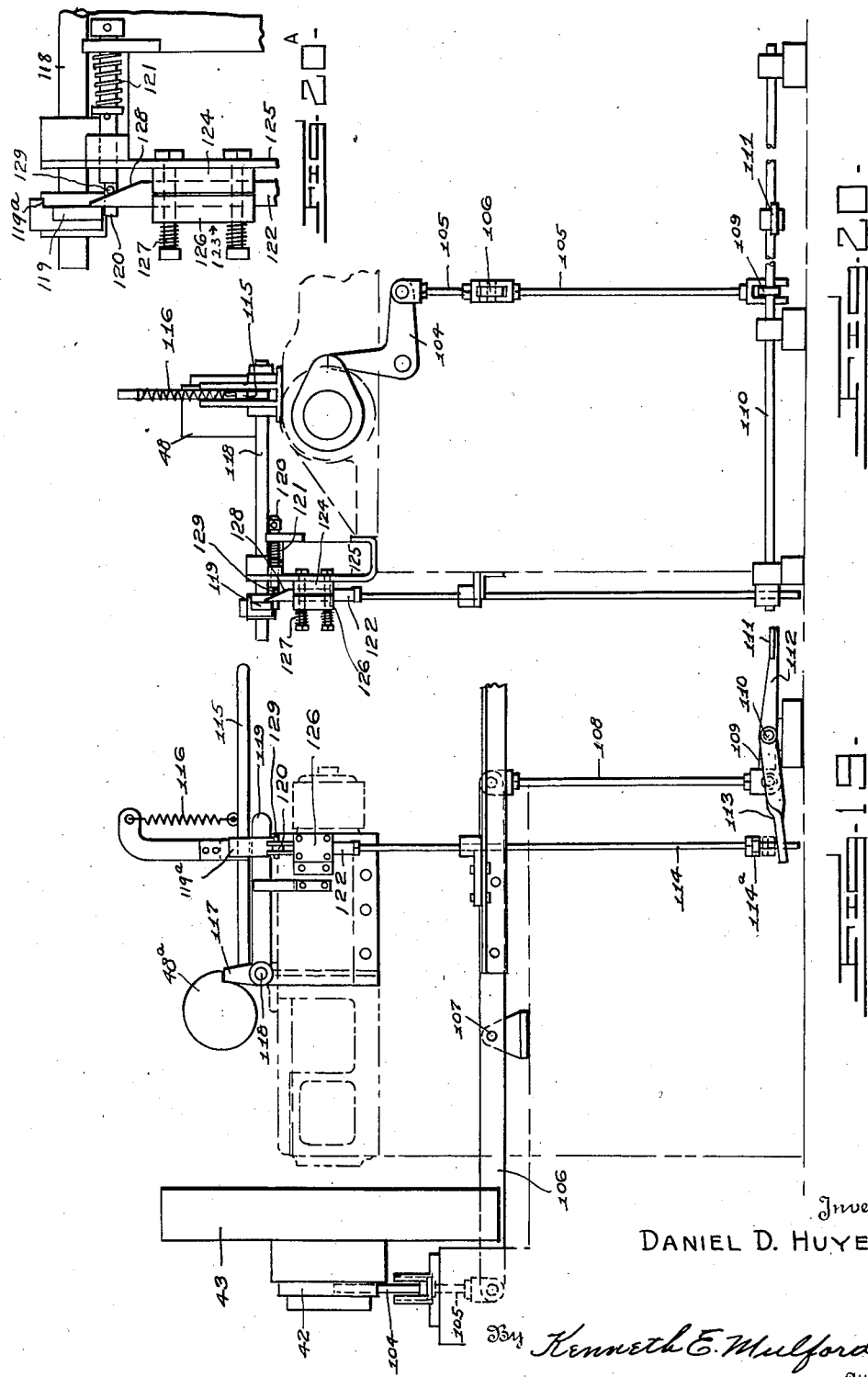
Inventor
DANIEL D. HUYETT,
By Kenneth E. Mulford
Attorney

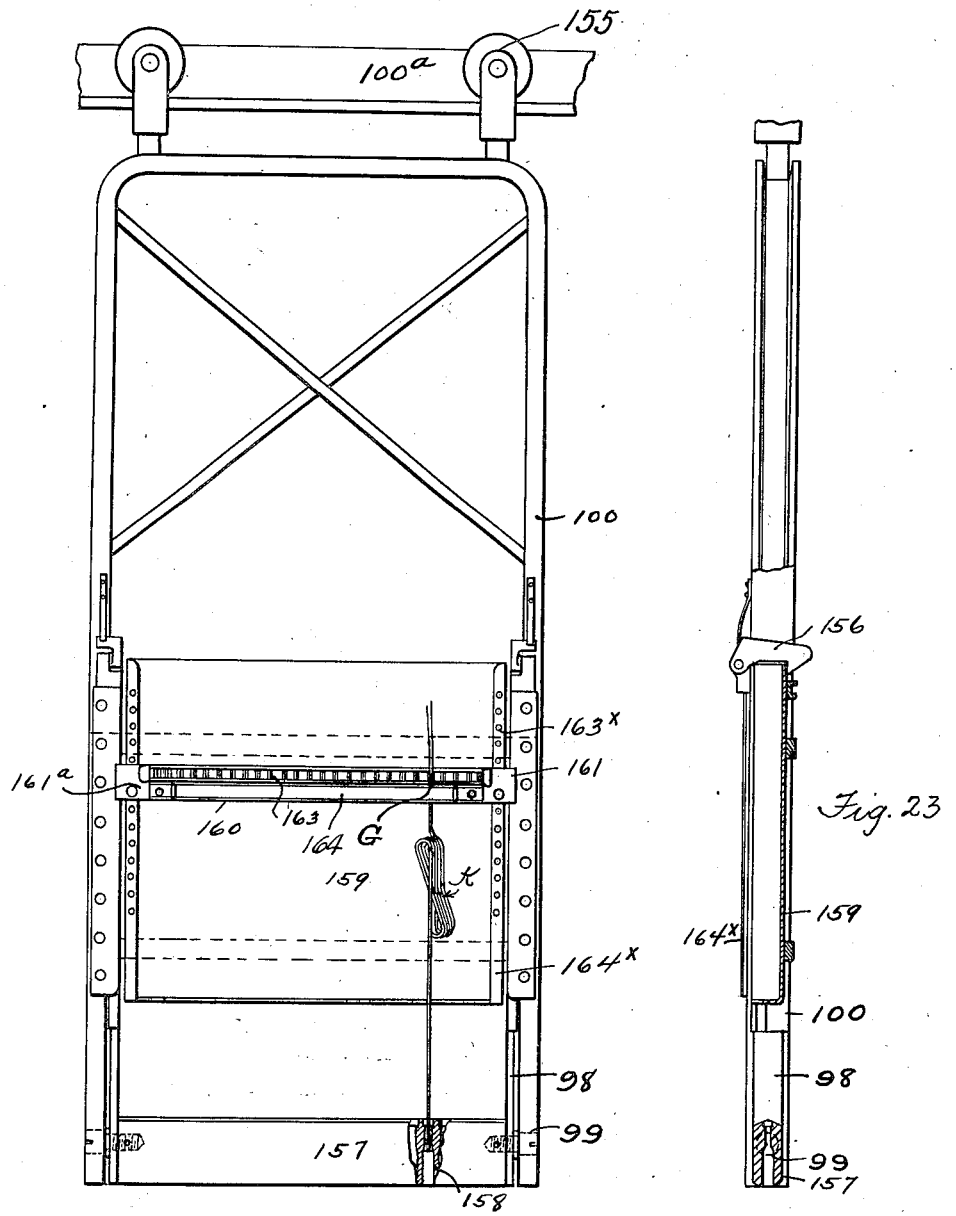

Daniel D. Huyett, Inventor
By Kenneth E. Mulford, Attorney

Patented July 21, 1942

2,290,188

UNITED STATES PATENT OFFICE 2,290,188

MACHINE FOR FORMING AND APPLYING SHUNTS

Daniel D. Huyett, Wilmington, Del., assignor to Atlas Powder Company, Wilmington, Del., a corporation of Delaware Application July 7, 1939, Serial No. 283,316

27 Claims. (Cl. 153—1)

This invention relates to a machine for applying shunts to the leg wires of detonators. These shunts consist of small pieces of metal which function to clip together and electrically unite the bare portions of detonator leg wires until the time of use of the detonator arrives. The purpose of these shunts is to prevent the accidental explosion of the detonator under the influence of stray currents. Such a shunt is made the subject of United States Letters Patent No. 1,597,445 to Grant, issued on the 24th day of August, 1926, and also illustrated in Fig. 14 of the accompanying drawings.

It is the object of the present invention to automatically manufacture and apply, in a single operation, a large number of these shunts, simultaneously. The machine is also capable of manufacturing the shunts rapidly and economically without at the same time applying them to detonator leg wires, if desired. The machine of the present invention is adapted to accomplish the objects set forth with a maximum of safety to the operators while handling the sensitive and powerful electric detonators or blasting caps commonly employed for setting off high explosive charges.

In the particular embodiment of the invention which I have chosen for purposes of illustration, a number of rolls of strip material such as aluminum, for example, are supported in such position that said strips of material may be fed to a cutting off station where a knife severs a small piece from the end of each strip, the severed pieces dropping into dies mounted upon a transfer head. The transfer head then moves forwardly to bring said dies into alignment with a row of pockets formed between fixed and movable members of a compressor head. The transfer head carries a row of plungers, one for each die, and when the transfer head is aligned with the compressor head, these plungers are forced downwardly and force the pieces of metal through the dies and deposit them in the pockets of the compressor head. In their passage through the dies, the pieces of metal are bent to V-shape and present their open sides upwardly as they rest in the said pockets.

The operator lays the leg wires of a long row of detonators in these pockets, one detonator to each piece of the bent metal or shunt. Then the movable member of the compressor head is actuated to flatten the V-shaped shunts and to clip them upon the said leg wires. As the transfer head moves back to the cutting station, the feeding mechanism for the aluminum strips is actuated, and the strips are fed forward preparatory to the cutting off of another row of the shunts.

The same movement of the machine which actuates the compressor head to clip a row of previously formed shunts upon the leg wires also causes the actuation of the knife to cut off the next row of shunts.

Referring now to the accompanying drawings:

Figure 1 is a plan view of the machine of the invention;

Fig. 2 is a front elevation thereof;

Fig. 3 is a sectional view upon line 3—3 of Fig. 2;

Fig. 4 is an end elevation of the right-hand end of the machine;

Fig. 5 is an enlarged view through the feed rolls, the line of section through the guides being about on the line 5—5 of Fig. 8;

Fig. 6 is an enlarged view through the cutting off knife and transfer head;

Fig. 7 is a fragmentary rear view of the transfer head;

Fig. 8 is a plan view of the structure of Fig. 5;

Fig. 9 is an enlarged sectional view of the fixed element of the knife and of both the fixed and movable members of the compressor head;

Fig. 10 is a sectional view through a portion of the base of the machine;

Fig. 11 is an enlarged view of a part of the compressor head;

Fig. 12 is a face view of a portion of the knives;

Fig. 13 is a face view of the stripper or scavenging comb;

Fig. 14 is a detail view of a detonator illustrating a shunt applied to the leg wires thereof;

Fig. 15 is a transverse sectional view on line 15—15 of Fig. 8;

Fig. 16 is an enlarged sectional view through one of the shunt forming dies hereinafter described;

Fig. 17 is a fragmentary view of a portion of one of the comb-like guides shown in section in Fig. 8;

Fig. 18 is a front elevation of a part of the compressor head;

Fig. 19 is a side view of the clutch control interlocking mechanism, hereinafter described.

Fig. 20 is a face view of the clutch control interlocking mechanism, hereinafter described.

Fig. 20A is an enlarged view of the locking pin of Figs. 19 and 20;

Fig. 21 is a detail view of the return actuating means of the movable bar of the compressor head;

Fig. 22 is a face view of the traveling carrier indicated in Fig. 3;

Fig. 23 is a vertical section view through a portion of said carrier and associated parts;

Like numerals designate corresponding parts throughout the several figures of the drawings.

Figures 24, 25:
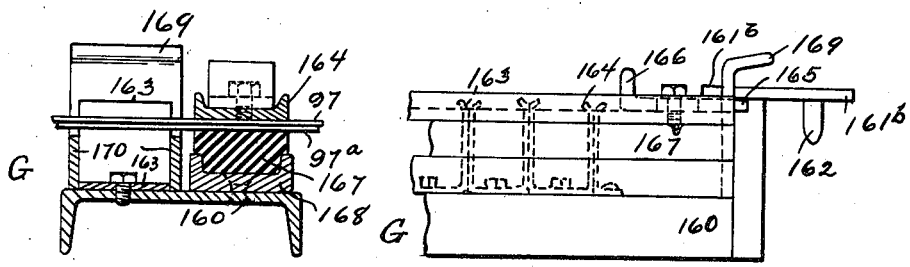
Fig. 24 is a transverse sectional view through the clamp shown in plan in Fig. 22.
Fig. 25 is a side elevation of a portion of the structure of Fig. 24.

Referring to the drawings, and more particularly to Fig. 3, 5 designates a box-like member constituting a magazine for receiving a plurality of rolls 6, of relatively easily bent metal. Where twenty-five shunts are to be applied at a time, there will be twenty-five of these rolls mounted upon a common shaft 7.

The magazine is provided with a lower edge opening 8, through which the twenty-five strips of metal will feed past a feeding station A to a cutting off station B. Here they are cut off and delivered to a transfer head C, carrying forming dies, presently described. This transfer head carries the cut off pieces to a compressor head D, where the cut pieces are shaped by the dies, delivered to the compressor head, and then pressed upon the leg wires of the detonators. (See Fig. 14.)

The strips of material 9 pass through guideways consisting of plates 10, 10ᵃ and strips 11, 11ᵃ. The strips are of T-shape in cross section and their shank portions enter grooves 12 formed in the faces of the plates. The entry of the shanks of the strips into the grooves 12 insures against the edges of the strips 9 being caught between the faces of said shanks and the faces of the plates. Two of the strips 9 being guided are illustrated in Fig. 15, and it will be seen that the construction described provides a firm support for these strips, both above and below the same.

The plate 10 is recessed for the reception of the back member 14 of a comb-like element, the fingers of which are indicated at 15. These fingers overlie the strips 9, and they overlap corresponding fingers 16 of a comb-like member the back 17 of which is engaged with and supported by plate 10ᵃ. The upper or positive feed roller 18 engages the tops of the strips and feeds them forward with a step by step movement as hereinafter described.

This upper feed roller 18 is a continuous one, and it is provided with circumferential grooves 19 which receive the fingers 15 of the upper comb. The lower rolls 20 are separate from each other; that is to say, there is one of these lower rolls for each of the strips. These lower rolls are not positively driven; they are supported in individual blocks 21. These blocks rest at 22 upon a portion of the bed plate 23 of the machine. The outer ends of these blocks rest upon adjusting screws 24, there being one of these adjusting screws for each of said blocks. Thus the tension of the rolls may be individually adjusted to take care of any variations in thickness or differences in nature of the particular strip resting thereon.

The adjusting screws 24 are carried by a plate 25 that is held in place by screws 26. A thrust screw 27, which acts against a part of the bed plate 23, provides means for adjusting the tension of all of the rolls simultaneously. This renders it possible to quickly release all of the rolls when new material is being threaded into the machine and to quickly restore the tension upon the feed mechanism as a whole, while as before stated, the screws 24 provide their individual adjustment of the several rolls.

As the strips are fed forward by the upper feed roller 18 through an intermittently acting pawl and ratchet mechanism, hereinafter described, the ends of said strips are projected across a fixed knife blade 28 (Figs. 6 and 12) that is secured to the bed plate of the machine. This fixed blade coacts with a movable blade 29, that is carried by a crosshead 30. The lower or cutting edge of the blade 29 is of shallow, sawtooth formation, as indicated at 29ᵃ in Fig. 12.

The fixed blade 28 carries tongues 28ᵃ which overlap the points of the teeth formed by the serration of the lower edge of blade 29 to insure proper alignment between the two blades. The manner in which this is effected without interfering with the feeding of the strips 9 between the two blades is clearly illustrated in Fig. 12. The crosshead 30 is provided with brackets 31, to which are pivoted the outer ends of a pair of rock levers 32. These rock levers are pivoted intermediate their ends upon rod 33, and they are pivotally connected at 34 to connecting rod extensions 35 (Figs. 3 and 10) of eccentric straps 36. These straps engage a pair of eccentrics 37 that are mounted upon a shaft 38 which underlies the bed plate 23.

The shaft 38 is driven by beveled gearing 39, 40 from a shaft 41. Shaft 41 extends to the exterior of the machine, where it constitutes one element of a conventional single revolution clutch 42. A continuously rotating pulley or balance wheel 43 receives a belt and constitutes the primary driving element of the machine.

Whenever by the operation of a suitable manual trip, such as a pedal, hereinafter described, the single revolution clutch is tripped, said clutch functions to clutch shaft 41 to pulley 43 to bring about a single revolution of shaft 41 and to consequently bring about a down and up stroke of the movable blade 29 of the knife.

The pulley drives through gears 44 and 45 (Figs. 1 and 3) and beveled gearing 46 and 47 to a single revolution clutch 48. When this clutch is tripped by a manually operable hand lever hereinafter described, it functions to bring about a single revolution of a shaft 50, which leads from and constitutes a part of said clutch.

The shaft 50 carries a pair of cams 51. These are positive action cams having cam grooves 52 in their faces, which positively engage rollers 53 upon levers 54. These levers are pivoted at their lower ends to brackets 55 of the bed plate, and they are pivotally connected at 56 to rods 57. As the cams rotate, these rods are given a reciprocatory movement.

The rods 57 constitute the actuating members of the transfer head C. This transfer head comprises a relatively heavy plate 58 (Figs. 3 and 6) having a strengthening rib 59 upon its outer face. The plate 58 is vertically grooved to receive a bank of punch-like plungers 60. The plungers are held in place in said grooves by a back plate 61.

The lower ends of these plungers cooperate with dies 62. (See Fig. 7.) These dies are secured to the rear face of plate 58 by screws 63, and they are shaped to constitute pockets 64, shoulders 65, and inclined walls 66. When the strips of material are fed forward between the fixed and movable blades of the knife, they are projected until they extend into the pockets 64.

The result is that when the knives act to sever the ends from the several strips of material, the relatively small metal pieces so severed drop and rest upon the shoulders 65 where they remain until the outward movement of the transfer head carries them into a position to overlie the compressor head D, it being understood that this outward movement is effected by the action of the cams 51, levers 54 and rods 57, the outer ends of said rods passing through the transfer head and being held in place by nuts 57ª.

In addition to carrying the cams 51, shaft 59 also carries cams 67 (Fig. 3) which in their revolution act against rollers 68. These rollers are rotatively mounted upon the ends of bent levers 69. These levers are pivoted at 70 upon brackets 71, and their outer ends carry adjustable screws 72.

When the transfer head is in its outermost position; that is to say, when it overlies the compressor head D, a transverse head plate 73 lies beneath the adjustable screws 72 in such position that when these screws descend under the action of the cams 67, their lower ends will engage wear plates 74, upon head plate 73, and depress said plate against the tension of springs 75, said head plate being yieldingly mounted with respect to the transfer head, through the medium of said springs 75 and studs 76.

The head plate 73 receives the upper ends of the plungers 60, and these plungers are yieldingly held to the head plate through the medium of a friction strip 77 (Fig. 6). By adjusting screws 78, the frictional engagement of strip 77 upon the plungers may be increased or diminished. It will be observed that the downward movement of the outer ends of bent levers 69 takes place after the transfer mechanism has moved outwardly so that the forming dies overlie the compressor head D. Therefore, when the head plate 73 is thrust downwardly by the action of these bent levers, the punch-like plungers 60 are caused to move downwardly.

The lower ends of these plungers engage the cut-off pieces of strip metal which up to this time have been resting upon the shoulders 65, and thrust said pieces downwardly between the downwardly converging walls 66. This bends these small pieces of metal to V-shape, with their open sides disposed upwardly, and they are thrust in this condition into the row of pockets presented by the compressor head D.

This compressor head comprises a fixed bar 79 that is secured to the bed plate 23, and a movable bar 80 (Figs. 9 and 11). The fixed bar carries upstanding, substantially triangular projections 81, while the movable bar carries a series of projections 82. These projections have complementally inclined, contacting surfaces 83, and when the movable bar of the compressor head has been moved toward the left, the inclined faces 83 of the projections 81 and 82 lie in engagement with each other, and the forward faces 84 of the projections of the movable bar lie in spaced relation to and in substantial parallelism with the rear faces 85 of the projections 81 of the fixed bar. (See Fig. 11.)

This leaves the open pockets 86 between the faces 84 and 85, and it is into these pockets that the formed, V-shaped shunts S are punched by the downward movement of the plungers. Thus it will be seen that this downward movement of the plungers forms the shunts to V-shape by thrusting them into the dies, and also thrusts them out of the dies and into the pockets 86 between the projections of the fixed and movable bars of the compressor head.

The movable bar 80, which is slidably mounted in the ways 87, is connected by means of a screw 88 with a slide 89 (Figs. 2 and 21). This slide is actuated by a short stroke eccentric 90 on the end of the shaft 41. A pin 91 has a slidable mounting in slide 89. This pin is normally projected outwardly beyond the end of the slide by a spring 92, placed in a pocket of the slide. The pin may be retracted against the tension of said spring by a finger piece 93, which projects laterally from the pin and through a slot 94.

The function of the pin 91 is to hold a hardened thrust cup 95 in place between the end of slide 89 and bar 80. By utilizing cups having heads of varying thickness, the length of throw of the movable bar of the compressor head may be varied according to the thickness and nature of the strip material used in the formation of the shunts.

The engagement of the head of the screw 88 with the slide 89 is such that there is sufficient lost motion between slide 89 and bar 80 that the movement of the bar to the right in its compressing action will be wholly under the influence of the thrust cup 95. However, this screw 88 functions to draw the bar 80 in the opposite direction upon the movement to the left of slide 89, thus bringing the parts to the position illustrated in Fig. 11, or in other words, opening the pockets 86 for the reception of another supply of shunts.

After the plungers have thrust the shunts down into the pockets 86 as described, the operator places the leg wires of the detonators in the open shunts. This operation is facilitated by the use of a clamp, hereinafter described, by means of which the operator is able to handle the leg wires of twenty-five detonators in one movement. By referring to Fig. 14, it will be seen that each detonator 96 has a pair of leg wires 97, 97ª, which are insulated through a portion of their length and are bare for the remainder of their length. Sometimes these leg wires are quite lengthy, and in that case, they are folded back and forth upon themselves to make a bundle, the detonator being at one end of the bundle and the bare ends being at the other end.

It is the bare ends of the pairs of leg wires that are placed in the open shunts, and after that has been done, the movable bar of the compressor moves to the right to bring its faces 84 forcibly toward the faces 85 of the fixed projections or abutments 81. This results in forcibly pressing the bowed shunts upon the bare portions of the detonator leg wires. Since the detonators to which these shunts are applied are about as sensitive and dangerous as any of the devices which explosive manufacturers are called upon to handle, it follows that means must be provided for handling them carefully and with the maximum of safety to the operator. It is common practice, in the manufacture of these detonators, to place a large number of them in racks. These racks are mounted upon trolleys, by which the racks with the detonators in them are carried past the various stations at which operations are to be performed, such for example as placing the match heads in the detonators, sealing the detonators with molten sulphur, inspecting the detonators, testing the detonators, etc.

The application of the shunts by this machine is one of the final operations, and the detonators, still in the racks, are brought upon their trolleys to a position in front of the machine of this invention. One of these racks is illustrated diagrammatically at 98. The rack frame is pivoted at 99 between arms 100 of a carrier which travels upon the trolley rail 100ª. A barrier 101 lies in position between the operator and the shunt machine so that if an explosion should occur, the operator will be at least in part protected.

When the frame constituted by the arms 100 and associated parts reaches a position in front of the shunt machine, the rack 98 is swung rearwardly and downwardly so that its inner ends may rest upon feet 102, carried by the bed plate of the machine. The operator then releases from the rack a clamp G, in which all of the detonator leg wires are clamped and by means of which he can place all of these detonator leg wires in the corresponding pockets of the compressor head. After this, the compressor head is actuated as described to clamp the shunts upon the leg wires.

Since safety is a primary essential in the handling of such sensitive devices as electric detonators, it is important that the machine be so constructed that the operator need not be unduly hurried, but upon the contrary, may be assured of sufficient time in which to make certain that everything is in proper position before the machine is set in operation to actuate the compressor head. It is for this reason that two single revolution clutches are provided, each having an individual, manually operable control.

It will be observed that one of these clutches serves as the actuating medium for the transfer head, the shunt forming plungers, and, through the action of the transfer head, for the feeding mechanism by which the strips are fed forward, while the other clutch serves as the control and actuating medium for the knife and the movable bar of the compressor head.

Providing separate manually operable control members for these two clutches renders it possible for the operator to take all the time that may be necessary, for safe operation, between the actuation of said clutches. While the cutting and pressing mechanism may operate more than once without intermediate operation of the strip feeding and transfer mechanism, such action would do no harm.

It is, however, important that two successive operations of the strip feeding and transfer mechanism without an intermediate operation of the cutting and pressing mechanism, be prevented, because such successive operation would cause the added shunt material to jam in the machine, with possible damage to the machine and a hold-up in operation. The interlocking mechanism by which this is assured is illustrated in Figs. 19 and 20.

The trip bell crank lever 104 (Figs. 19 and 20) of the single revolution clutch 42 is connected by a link 105 with one end of a rock lever 106. This lever is pivoted at 107, and at its other end is connected by a link 108 with a crank arm 109 of a shaft 110, said shaft extending along the floor beneath the machine. This shaft carries a treadle 111 on a crank arm 112, this crank arm likewise being connected to shaft 110.

When the treadle is depressed, link 108 is lifted, connection 105 is drawn downwardly, and this in turn draws downwardly upon the outer end of bell crank lever 104 to move the nose of the other arm of said bell crank lever out of engagement with an element of the single revolution clutch to permit said clutch to make one complete revolution.

The shaft 110 also carries a crank arm 113 which thrusts upwardly upon a sliding rod 114 when the treadle is depressed. The hand-operated lever 115 of the other single revolution clutch 48, when moved downwardly against the tension of a spring 116, withdraws the nose of a dog 117 from engagement with a rotative member 48ª of said single revolution clutch 48 and permits said clutch to make a single revolution.

The dog 117 is rigidly affixed to handle 115, and is also rigidly affixed to a rock shaft 118. This rock shaft carries an arm 119. A transversely movable pin 120 is spring actuated toward the left in Fig. 20 by a spring 121, and whenever this pin underlies arm 119, handle 115 will be locked against downward or clutch-releasing movement.

The upper end of the vertically sliding rod 114 carries a sleeve 122 which slides through a friction guide 123. This guide comprises a base plate 124 that is secured to a bracket 125, and a cap 126 that is pressed by springs 127 toward and into engagement with the sleeve 122. The upper end of this sleeve is bifurcated, and the jaws thereby created straddle the pin 120.

The inner faces of these jaws are beveled or inclined at 128 to constitute cams adapted to act against transverse studs 129 which are carried by and project beyond the sides of pin 120. When the rod 114 moves upwardly, these cam faces 128 act to thrust the pin 120 to the right against the tension of spring 121 to thereby move the end of said pin from beneath arm 119.

The tension of the spring 116 is such that whenever the handle 115 is released, the spring moves dog 117 to clutch-arresting position. With the pressure upon the treadle released, and with the handle 115 in elevated position under the action of spring 116, no part of the machine will be in operation. When the rod 114 has been thrust upwardly, it remains in elevated position and holds the pin 120 in retracted position until handle 115 is again pulled downwardly.

It is possible for the rod 114 to remain in elevated position as described without partaking of the return movement of treadle 111 because the lower end of rod 114 merely passes through a hole in crank arm 113. Consequently, said crank arm merely thrusts upwardly against the nuts 114ª when the treadle is depressed, and the rod 114 and associated parts are held in elevated position as described, by the action of the cap 126 of the friction guide 123.

As previously stated, the operation of the feeding mechanism for the strips of shunt material is under the influence of the transfer head, and to effect this, a ratchet wheel 130 (see Fig. 4) is mounted upon the end of the continuous feed roller 18 (Fig. 5), the shaft of said roller being indicated at 18ª in Fig. 4. A pawl-carrying disk 131 is given an oscillatory motion by means of pins 132 and 133, said pins contacting alternately with a lug 134 upon said disk.

When the transfer head moves to the right in Fig. 4, pin 132 turns the disk 131 toward the right, and this causes pawls 135 upon said disk to turn the feed roller 18 to the right and thus impart a forward feeding movement to the strips of shunt material. When the transfer head moves toward the left in Fig. 4, pin 133, which is secured to the side of one of the rack bars 57, contacts lug 134 and moves the disk 131 and its pawls to cause said pawls to take a fresh bite upon the teeth of the ratchet wheel 130 preparatory to continuing this step by step forward feeding movement of the shunt material in successive movements of the transfer head toward the right.

Thus it will be seen that it is the return movement of the transfer head which imparts the forward feeding movement to the strips of shunt material, and that this movement projects the ends of these strips through the openings of the knife to such an extent that when the transfer head has completed its movement toward the right, these projecting ends will lie in pockets 64 of the dies and above the shoulders 65.

The next operation of the machine after the transfer head has reached its position toward the right is the operation of the single revolution clutch 42 which, as before stated, does two things, to wit: it actuates the compressor head D to compress the shunts delivered thereto in the outward movement of the compressor head, and it actuates the knife to cut off the projected ends of the shunt material and deposit them upon the shoulders 65 in preparation for the next outward movement of the transfer head and the forcing of these cut-off pieces through the dies and into the pockets of the compressor head.

Thus, a complete cycle of operation of the machine is as follows: the operator first presses upon handle 115 to release the single revolution clutch 48. Thereupon, the transfer head, with a previously cut-off row of shunts resting upon the shoulders 65, moves outwardly to a position to overlie the pockets of the compressor head. Then the plungers descend, form the shunts and force them into the pockets of the compressor head.

The movement of the transfer head continues until it returns to a position adjacent the knife, and in such return movement feeds more shunt material forward and into the pockets 64. When these things have been accomplished, the single revolution clutch 48 will have completed its cycle of operation, and the machine will come to rest with the pin 120 underlying bar 119 to prevent a second operation of handle 115 until treadle 111 has been operated.

When treadle 111 is operated, the single revolution clutch 42 will be released to make one revolution, and this in turn will actuate the compressor head, compress the shunts onto the leg wires, and actuate the knife to cut off the projected ends of the shunt material. In the operation of depressing the treadle 111, rod 114 will be thrust upwardly to retract pin 120 and move it out of the path of handle 115, and sleeve 122 will remain in elevated position to hold pin 120 in this retracted position until said sleeve is thrust downwardly by overhanging projection 119ª of arm 119 in the next operation of handle 115.

When in the passage of a rack of detonators past the various stations hereinbefore referred to, an inspection discloses that one or more of said detonators is faulty, the leg wires of the faulty detonator or detonators are bent downwardly and out of the line of the leg wires of the other detonators so that such faulty detonator will not have a shunt applied thereto in the operation of the compressor head.

However, this renders it necessary to get rid of the unused shunt, because if that were not done, there would be two shunts deposited in that particular pocket upon the next movement of the plungers through the dies. To this end, a scavenging comb 136 is hingedly mounted at 137 upon the face of the transfer head C and the lower ends 138 of the teeth of this comb sweep through the pockets of the compressor head upon the outward movement of the transfer head, to thereby sweep out of said pockets any unused shunts which may have been left therein.

A finger 139 bears against the comb and has a portion 140 which rests upon the upper face of the rib 59 of the transfer head. A spring actuated presser foot 141 is pressed downwardly by a spring 142 which surrounds a bolt 143 that is threaded into rib 59. Therefore, outward swinging movement of the lower portion of the comb 136 upon its hinge 137 is resisted by spring 142.

In the outward movement of this scavenging comb, it contacts a dog 144 (Fig. 4) that is pivotally mounted at 145. A portion of the comb thrusts this dog outwardly against the tension of a spring 146 until the comb completely clears said dog. Then the dog snaps back under the influence of spring 146 and lies in the path of the comb in the return movement of the latter toward the right.

In this return movement, portion 136$^x$ (Fig. 13) of the comb rides over the rounded face 147 of the dog, and said comb is moved upon its hinge and against the tension of finger 139 to lift the teeth of the comb to such a height that in such return movement they will pass completely over the shunts which were deposited in the pockets of the compressor head at the termination of the outward movement of the transfer head.

The result is that the comb gets back to the position illustrated in Fig. 4 without disturbing said deposited shunts, leaving them ready to receive the leg wires of another batch of detonators. It will be observed that the transfer head does not move in a horizontal line but moves in an inclined path over bar 80.

It is at the outer edge of this bar that the projections 82 are located, and the reason for disposing this bar at an angle is to facilitate the entry of the detonator leg wires into the pockets of the bar of the compressor head, it being borne in mind that a considerable length of bare wire extends beyond the shunts after they are applied.

It is clear that much of the value of the shunt would be lost if it were not applied rather closely to the termination of the insulation upon said leg wires, because stray currents imposed upon the wires inwardly of the shunt might bring about accidental explosion of the detonator. The existence of these bare ends extending inwardly upon the shunts makes it necessary to provide sufficient space to accommodate these ends, and the relatively wide bar 80 provides such space. An important reason for spacing the cut-off knife so far rearwardly of the compressor head is to leave the table like part constituted by bar 80, unobstructed, so that the bared portions of the detonator leg wires may extend thereacross. This rearward spacing of the cut-off knife away from the compressor head is compensated for by the travel of the transfer head, which carries the shunts from the knife to the compressor head and yet does not interfere with the proper placement of the bared portions of the shunt wires in the shunts.

However, the disposition of the transfer head and associated parts at an inclination imposes the force of gravity upon the transfer head and the parts carried thereby. To balance this force and to thereby provide an easy-running, well balanced machine, the rods 57 are provided with racks 148 which mesh with pinions 149 on the shaft 150.

This shaft carries a sprocket wheel 151. A sprocket chain 152, carrying a weight 153, passes over an idler sprocket 154 and partly around the sprocket 151 and is then secured to the latter sprocket. The action of the weight counterbalances the action of gravity upon the transfer head, as will be readily understood.

In Figs. 24 to 28, I have illustrated two forms of wire holding and manipulating clamps and one of the traveling carriers or racks with which these clamps are associated. Referring especially to Figs. 22 and 23, it will be seen that the frame of the carrier 100 is of inverted U-shape and is hung upon trolley wheels 155.

The side bars 98 are pivoted as previously stated at 99 and these side bars and the parts carried thereby are capable of being held in the position illustrated in Fig. 3 by latches 156. A transverse block 157 is mounted between the side bars 98 of the rack and is provided with a row of openings 158 for the reception of the detonators. The leg wires of the detonators are led from this opening and across a shallow tray 159.

It is frequently, and indeed usually, the case that there is such a length of wire between the detonator and the bare ends to which the shunts are to be applied that this excess wire must be folded into a bundle. Usually these bundles are in the form of figure-eight folds to prevent tangling of the wire when it is drawn out to its full length when the time of use, in the field, arrives. Bundles of this sort are illustrated in Fig. 1 of the patent to David M. McFarland, No. 1,983,141, of December 4, 1934.

The bundles of wire are received in the tray 159, and the bare ends of the wire, i. e., those portions beyond the insulation upon the wire, are secured in a clamp bar G which spans the tray 159. I have illustrated one of the bundles of wire at K, but it will be understood that where twenty-five shunts are to be applied, there will be twenty-five of these bundles lying in a row across the tray.

Figure 26:
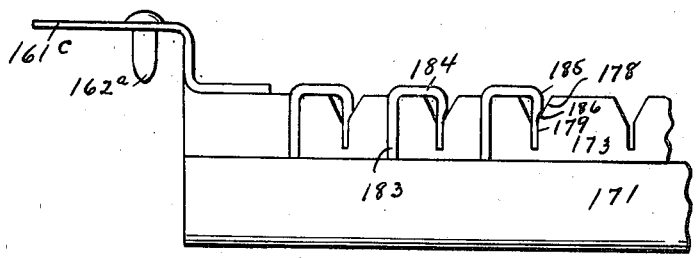
Fig. 26 is a side view of a modified form of clamp.
Figure 27:
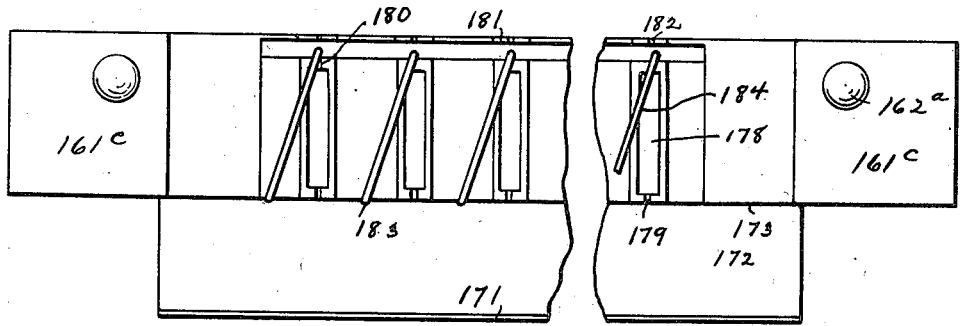
Fig. 27 is a fragmentary side elevation of the clamp of Fig. 26.
Figure 28:
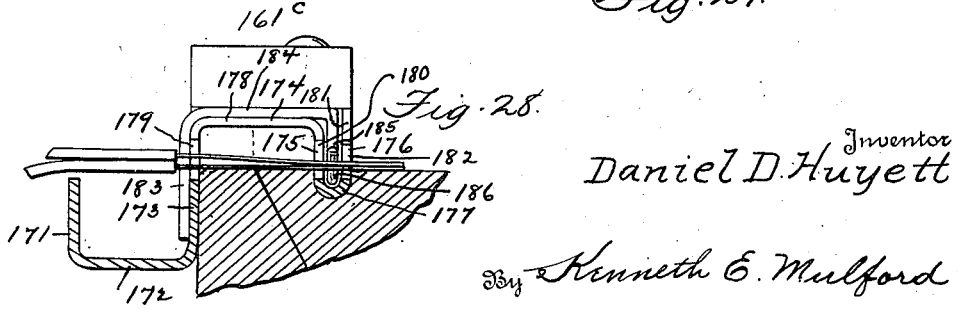
Fig. 28 is an enlarged transverse sectional view of the clamp of Fig. 26 showing the same positioned upon the compressor head.

One form of clamp bar, hereinafter designated simply a clamp, is illustrated in Figs. 22, 24 and 25, while a modified form of clamp is illustrated in Figs. 26 to 28. The first-named form of clamp comprises a base 160, of channel formation, having the overhanging projecting ends 161 provided with dowel pins 162, adapted to take into any of the row of openings 163$^x$, formed upon overhanging strips 164$^x$ which extend along the top of the sides of the tray.

The base 160 carries a row of upstanding spring clips 163, and the insulated portions of the detonator leg wires 97, 97$^a$ are initially secured in these spring clips, while a longitudinally extending clamp bar 164 is being secured in place. This clamp bar is secured in place by inserting its left-hand end beneath an overhanging portion 161$^a$ of the dowel carrying element 161, and by then pressing said bar firmly downward until a slidable bolt 165 may be projected by its operating handle 166 beneath the corresponding overhang 161$^b$ of the dowel carrying element 161.

It will be observed that the nose of this bolt is beveled, and when it is pushed home, it forces the bar 164 firmly toward a rubber strip 167, supported in a channel 168 that is mounted upon the base 160. This action grips the insulated portions of the leg wires firmly between the clamp bar and the rubber strip 167.

A pair of handles 169 project upwardly from the opposite ends of a pair of stripper bars 170. When these stripper bars are lifted by said handles after the clamp bar 164 has been removed, this action strips the entire row of leg wires out of the spring clips 163. However, this stripping action does not take place until after the clamp has functioned to bring the leg wires to proper position for the application of the shunts.

This is effected by the operator's bodily lifting the clamp out of its position upon the tray after the tray has been moved to juxtaposition to the compressor head as illustrated in Fig. 3. By a proper manipulation of the clamp, the bare portions of the detonator leg wires are caused to extend through the pockets 86 (Fig. 11) so that when the operator presses upon the treadle, an entire row of shunts will be clipped upon these bare portions.

The clamp of Figs. 26 to 28 comprises a strip of sheet metal bent to the form illustrated in Fig. 28 and carrying at each end overhanging plates 161$^c$, which correspond in function with the dowel carrying element 161 of Fig. 27; that is to say, they are provided with dowels 162$^a$ which are adapted to engage in the openings 163$^x$ at the side of the tray.

The strip of sheet metal from which the clamp is formed comprises a vertically disposed run 171, a horizontal run 172, a second vertically disposed run 173, an upper horizontal run 174, a third vertical run 175, and another vertical run 176 connected with the run 175 by a bowed portion 177. The upper horizontal run is cut to form V-shaped channels 178 which terminate in relatively narrow straight portions 179, 180, which extend down into the vertical runs 173 and 175.

Correspondingly shaped channels 181 are formed in the upper terminal end of the vertical run 176, these openings likewise terminating in more constricted portions 182, which lie in alignment with and are shaped like the portions 179, 180. Wire latches have their vertical legs 183 welded or otherwise secured to the rear face of the run 173, said latches comprising horizontal extensions 184 which extend obliquely across the clamp and are provided with downturned ends 185.

These downturned ends lie between the runs 175 and 176, and they are provided with flattened portions 186. When the leg wires of the detonator are forced downwardly into the constricted openings 179, 180 and 181, the spring latches are forced back until the leg wires reach the flattened portions 186, whereupon the ends of the spring latches snap over the leg wires and hold them securely against accidental upward or outward movement.

At this time, the bare portions of the detonator leg wires will span the space between the runs 173 and 175, while the insulation of the leg wires will lie close to the outer face of the run 173. With the parts in this position, the whole clamp may be fitted over the projections 81 and 82 of the compressor head as indicated by dotted lines in Fig. 9, and thus the leg wires will be very accurately positioned and very firmly held during the time that the compressor head acts to clip the shunts upon said leg wires.

It is, of course, apparent that many ways will readily suggest themselves, to those skilled in the art, for the manufacture of clamps adapted to serve the purposes of those herein shown and described, and I wish it to be understood that the invention is in no way limited to the use of any particular manipulating means for the leg wires of the shunts. The action of the machine in applying the shunts is in no way modified or affected by the means employed to get the detonator leg wires into the pockets of the compressor head.

Having described my invention, what I claim is:

1. In a shunt applying machine, the combination with a compressor head formed to receive a plurality of formed shunts and the leg wires of detonators to which said shunts are to be applied and disposed adjacent the front side of the machine; of a transfer head, a plurality of shunt forming elements upon the transfer head, a severing means adapted to sever the ends of a plurality of strips of shunt material simultaneously and to deposit the severed ends in the shunt forming elements of the transfer head, said severing means lying in materially spaced relation to the compressor head and rearwardly thereof, means for moving the transfer head from a position adjacent the severing means to a position adjacent the compressor head, means for thrusting the severed ends of shunt material through the shunt forming elements of the transfer head and into the compressor head and means for supporting a row of loaded detonators with their attached leg wires in position to dispose the bared portions of said leg wires within the shunts.

2. In a shunt applying machine, the combination with a compressor head formed to receive a plurality of formed shunts and the leg wires of detonators to which said shunts are to be applied and disposed adjacent the front side of the machine; of a transfer head, a plurality of shunt forming elements upon the transfer head, a knife spaced materially rearwardly from the compressor head and adapted to sever the ends of a plurality of strips of shunt material simultaneously and to deposit the severed ends in the shunt forming elements of the transfer head, means for moving the transfer head from a position adjacent the knife to a position adjacent the compressor head, means for thrusting the severed ends of shunt material through the shunt forming elements of the transfer head and into the compressor head and means for supporting a row of loaded detonators with their attached leg wires in position to dispose the bared portions of said leg wires within the shunts.

3. In a shunt applying machine, the combination with a compressor head formed to receive a plurality of formed shunts and the leg wires of detonators to which said shunts are to be applied and disposed adjacent the front side of the machine; of a transfer head, a plurality of shunt forming elements upon the transfer head, a knife spaced materially rearwardly from the compressor head and adapted to sever the ends of a plurality of strips of shunt material simultaneously and to deposit the severed ends in the shunt forming elements of the transfer head, means for moving the transfer head from a position adjacent the knife to a position adjacent the compressor head, means for thrusting the severed ends of shunt material through the shunt forming elements of the transfer head and into the compressor head, a feed mechanism for the strips of shunt material adjusted to feed the ends of the strips of shunt material past the knife and into the shunt forming elements of the transfer head and means for supporting a row of loaded detonators with their attached leg wires in position to dispose the bared portions of said leg wires within the shunts.

4. In a shunt applying machine, the combination with a compressor head shaped to provide a plurality of pockets between a plurality of pairs of compressing elements, said pockets being shaped and dimensioned to receive a plurality of formed shunts; of a knife spaced materially rearwardly from the compressor head, a transfer head movable from a position adjacent the knife to a position adjacent the compressor head, a plurality of forming dies for the shunts carried by and movable with the transfer head, a plurality of plungers carried by and movable with the transfer head and serving when actuated to thrust pieces of shunt forming material through the forming dies of the transfer head and into the pockets of the compressor head, means for actuating all of said plungers simultaneously after the transfer head reaches its position in proximity to the compressor head, means for supporting a row of loaded detonators with their attached leg wires in position to dispose the bared portions of said leg wires within the shunts and means for thereafter actuating the compressor head to cause its compressing elements to flatten the shunts and clip them upon the leg wires of detonators.

5. A structure as recited in claim 4, wherein the plungers are yieldably mounted in the compressor head.

6. A structure as recited in claim 4, in combination with a scavenging element carried by the transfer head and having a plurality of projections which sweep through the pockets of the compressor head in the forward movement of the transfer head.

7. A structure as recited in claim 4, in combination with a scavenging element carried by the transfer head and having a plurality of projections which sweep through the pockets of the compressor head in the forward movement of the transfer head, and means for moving said scavenging element to elevate it above said pockets in the return movement of the transfer head.

8. A structure as recited in claim 4, in combination with a magazine for supporting a plurality of relatively narrow strips of thin, shunt-forming material, feeding means associated with the knife, and mechanism operating in synchronism with the transfer head for imparting a step by step movement to the feeding means to thereby project the ends of the strips of shunt forming material past the knife.

9. In a shunt applying machine, the combination with a compressor head shaped to provide a plurality of pockets between a plurality of pairs of compressing elements, said pockets being shaped and dimensioned to receive a plurality of formed shunts; of a knife spaced materially rearwardly from the compresser head, a transfer head movable from a position adjacent the knife to a position adjacent the compressor head, a plurality of forming dies for the shunts carried by and movable with the transfer head, a plurality of plungers carried by and movable with the transfer head and serving when actuated to thrust pieces of shunt forming material through the forming dies of the transfer head and into the pockets of the compressor head, means for supporting a row of loaded detonators with their attached leg wires in position to dispose the bared portions of said leg wires within the shunts, means for actuating all of said plungers simultaneously after the transfer head reaches its position in proximity to the compressor head, means for thereafter actuating the compressor head to cause its compressing elements to flatten the shunts and clip them upon the leg wires of detonators, and a feeding means for imparting a step by step movement to the shunt forming material past the knife and into said dies, and means for actuating said feeding means during the return movement of the transfer head toward the knife.

10. In a shunt applying machine, the combination with a compressor head shaped to provide a plurality of pockets between a plurality of pairs of compressing elements, said pockets being shaped and dimensioned to receive a plurality of formed shunts; of a knife spaced materially rearwardly of the compressor head, a transfer head movable from a position adjacent the knife to a position adjacent the compressor head, a plurality of forming dies for the shunts carried by and movable with the transfer head, a plurality of plungers carried by and movable with the transfer head and serving when actuated to thrust pieces of shunt forming material through the forming dies of the transfer head and into the pockets of the compressor head, means for supporting a row of loaded detonators with their attached leg wires in position to dispose the bared portions of said leg wires within the shunts, means for actuating all of said plungers simultaneously after the transfer head reaches its position in proximity to the compressor head, means for thereafter actuating the compressor head to cause its compressing elements to flatten the shunts and clip them upon the leg wires of detonators, a positively actuated feed roller for feeding strips of shunt forming material past said knife, and a pawl and ratchet connection between said feed roller and the transfer head operable during the return movement of the transfer head towards the knife to impart a partial rotation to said feed roller to simultaneously move the ends of a plurality of strips of shunt forming material past the knife and into the shunt forming dies of the transfer head.

11. A machine of the character described comprising a knife, a compressor head, a transfer head movable from a position adjacent the knife to a position adjacent the compressor head, a plurality of shunt forming plungers carried by the compressor head, a feed mechanism constructed to feed a plurality of strips of material simultaneously past the knife, a driving element, a pair of single revolution clutches actuated from said driving element, driving connections from one of said clutches to the compressor head and the knife and from the other of said clutches to the transfer head, the plungers and the feed mechanism, separate, manually operable control means for said clutches, and an interlocking means between the control means constructed to prevent more than one operation of the transfer head, plungers, and feed mechanism until there has been an intermediate operation of the compressor head and knife.

12. A machine of the character described comprising a knife, a compressor head, a transfer head movable from a position adjacent the knife to a position adjacent the compressor head, a plurality of shunt forming plungers carried by the compressor head, a feed mechanism constructed to feed a plurality of strips of material simultaneously past the knife, a driving element, a pair of single revolution clutches actuated from said driving element, driving connections from one of said clutches to the compressor head and the knife and from the other of said clutches to the transfer head, the plungers, and the feed mechanism, a hand lever for operating the single revolution clutch which controls the transfer head, plungers, and feed mechanism, a treadle for controlling the single revolution clutch which actuates the compressor head and knife, and an interlocking means between said hand lever and treadle for preventing more than one operation of the hand lever until there has been an intermediate operation of the treadle.

13. In a machine of the character described, the combination with a knife of means for feeding a plurality of strips of metal past said knife, a compressor head, a transfer head, means for bodily moving the transfer head from a point adjacent the knife to a point adjacent the compressor head, a plurality of shunt forming plungers and dies carried by the compressor head, a pair of single revolution clutches, one of which actuates the compressor head and the knife, and the other of which actuates the transfer head and its shunt forming dies, a pair of separate, manually operable members for said clutches, and an interlocking means between said manually operable members preventing successive operations of the transfer head and associated parts without an intermediate operation of the compressor head.

14. A structure as recited in claim 13, wherein one of said manually operable members comprises a handle and the other comprises a treadle, a spring-actuated detent pin movable under the action of its spring into handle-arresting position, and a member actuated by the treadle and acting against said pin to retract it against the tension of its spring from handle-arresting position.

15. A structure as recited in claim 13 wherein one of said manually operable members comprises a handle and the other comprises a treadle, a rock shaft by which the handle is carried and which is rocked by the operation of said handle to release its clutch, an arm carried by said rock shaft, a laterally movable pin adapted to engage beneath said arm, a spring normally tending to move said pin to arm-engaging position, a member projecting from the side of said pin, a cam adapted to engage the member of the pin, a thrust rod by which said cam is carried, and connections between the thrust rod and the treadle.

16. A structure as recited in claim 13 wherein one of said manually operable members comprises a handle and the other comprises a treadle, a rock shaft by which the handle is carried and which is rocked by the operation of said handle to release its clutch, an arm carried by said rock shaft, a laterally movable pin adapted to engage beneath said arm, a spring normally tending to move said pin to arm-engaging position, a member projecting from the side of said pin, a cam adapted to engage the member of the pin, a thrust rod by which said cam is carried, connections between the thrust rod and the treadle, and a friction bearing for said thrust rod.

17. A machine of the character described comprising a bed plate, a compressor head supported upon the bed plate adjacent the forward end thereof, a knife disposed at a point a sufficient distance rearwardly of the compressor head to provide for the laying of leg wires of detonators across the compressor head and toward said knife, a transfer head movable from a position adjacent the knife to a position above the compressor head, a plurality of shunt forming dies and plungers carried by and bodily movable with the transfer head, a pair of sliding rods by which the transfer head is carried, swinging levers connected to said rods, a transversely acting cam shaft, cams thereon engaging the swinging levers for effecting movement of the transfer head, and additional cams upon the cam shaft operable after the movement of the transfer head has been completed to depress all of said plungers simultaneously.

18. A structure as recited in claim 17 in combination with an eccentric shaft, eccentrics thereon, a pair of swinging levers, means for pivoting said levers intermediate their ends, connections between one end of said levers and the eccentrics and connections between the other end of said levers and the knife.

19. A structure as recited in claim 17 in combination with an eccentric shaft, eccentrics thereon, a pair of swinging levers, means for pivoting said levers intermediate their ends, connections between one end of said levers and the eccentrics, connections between the other ends of said levers and the knife, a pair of single revolution clutches, connections between one of said clutches and the eccentric shaft, and connections between the other of said clutches and the cam shaft.

20. A machine of the character described comprising a bed plate, a compressor head at the forward edge of the bed plate, feed rolls disposed rearwardly of the compressor head, a cut off station between the feed rolls and the compressor head, a knife at said cut off station, a transfer head in advance of the knife movable from the knife to a position above the compressor head, and guides for a plurality of strips of shunt material, leading from the feed rolls to the knife, said guides, knife and compressor head being disposed in a downwardly and forwardly inclined position and shunt-forming members carried by the transfer head.

21. A structure as recited in claim 1, wherein the movement of the transfer head and the parts carried thereby is in a downwardly inclined path, and means for counterbalancing the weight of the transfer head and said parts.

22. The combination with a machine of the character described having a compressor head comprising a row of pockets extending along a side of the machine; of a carrier, means for mounting said carrier for movement to a position adjacent said pockets, and a clamp upon the carrier adapted to clamp the ends of a number of detonator leg wires, said clamp being shaped, dimensioned and mounted in such manner as to adapt it to be lifted bodily from the carrier and placed in such juxtaposition to the compressor head as to simultaneously deposit the leg wires of a number of detonators in the pockets of the compressor head.

23. In a machine of the character described, the combination with a compressor head comprising a fixed bar and a movable bar having a plurality of upstanding projections which, when the movable bar is in one position, provide a series of transverse pockets; of a clamp provided with means for engaging the leg wires of a plurality of detonators, said clamp being provided with means by which it may be manually lifted and placed in such juxtaposition to the compressor head as to cause the bare portions of the leg wires to traverse the pockets of the compressor head.

24. In a machine of the character described, the combination with a compressor head comprising a fixed bar and a movable bar having a plurality of upstanding projections which, when the movable bar is in one position, provide a series of transverse pockets; of a clamp provided with means for engaging the leg wires of a plurality of detonators, said clamp comprising means shaped to fit over and embrace the projections of the bars of the compressor head.

25. In a machine of the character described, the combination with a compressor head presenting a row of open-top pockets along one side of the machine; of a carrier, means for mounting said carrier to travel to a position adjacent said pockets, a rack pivoted upon the carrier to be lowered toward a horizontal position and comprising a tray, detonator-receiving means at the bottom of the rack, a clamp, and means for mounting the clamp removably upon the tray, said clamp being constructed to receive and grip the bare ends of the leg wires of detonators and to be manually lifted from the tray to simultaneously position the bare portions of the leg wires of the detonators in the open-top pockets of the compressor head.

26. In a machine for applying shunts to the leg wires of electric detonators of the character wherein said leg wires comprise portions covered with insulation, and bared ends extending beyond said insulated portions, the combination with a compressor head formed to receive a formed shunt and those portions of the leg wires of a detonator adjacent the termination of the insulation thereon, of a shunt-forming element coacting with said compressor head, means for cutting off and feeding the required amount of shunt material to the shunt-forming element, means for actuating the shunt-forming element to cause it to transfer the shunt material from the cutting-off means to the compressor head and to cause said shunt-forming element to form a shunt and deposit it in the compressor head, means for thereafter actuating the compressor head to clasp the formed shunt on the detonator leg wires adjacent the point of termination of the insulation thereon and means for supporting the detonator proper at a point wholly outside of the line of movement of any of the named parts whereby possibility of explosion of the detonator by contact with any of the moving machine parts is prevented.

27. In a shunt-applying machine, the combination with a compressor head formed to receive a formed shunt and the leg wires of a detonator to which said shunt is to be applied; of a shunt-forming and transfer element coacting with said compressor head, means for cutting off and feeding the required amount of shunt material to the shunt-forming element, said cutting off means being located at a point materially spaced from the compressor head, means for shifting the shunt-forming and transfer element to cause it to carry the cut off shunt material from the means for feeding and cutting off the shunt material to the compressor head, means to cause said shunt-forming element to there form a shunt to receive the detonator leg wires and deposit it in the compressor head, and means for thereafter actuating the compressor head to clasp the formed shunt on the detonator leg wires.

DANIEL D. HUYETT.